Patented Nov. 20, 1951

2,575,992

UNITED STATES PATENT OFFICE 2,575,992

POLYMERIC LUBRICATING OIL ADDITIVES

Jeffrey H. Bartlett, Westfield, N. J., assignor to Standard Oil Development Company, a corporation of Delaware No Drawing. Application September 30, 1948, Serial No. 52,125

2 Claims. (Cl. 252—56)

This invention relates to a novel type of polymerization product and to methods of preparing such products and using them for various purposes, more particularly as additives for lubricating oils. The products are especially suitable as pour point depressants in waxy mineral lubricating oils.

Broadly, the invention comprises the production of novel products by the polymerization of esters of unsaturated tricarboxylic acids wherein at least one of the ester groups comprises a saturated alkyl group having at least 8 carbon atoms and preferably in the range of 8 to 22 carbon atoms. More particularly, the invention relates to the esters of alpha beta unsaturated tricarboxylic acids which may be polymerized or which may be copolymerized with other unsaturated materials. The most common of the alpha beta unsaturated tricarboxylic acids is aconitic acid which is generally prepared from citric acid. However, other alpha beta unsaturated tricarboxylic acids are suitable for the manufacture of pour depressant material. Among these are methyl aconitic acid, alpha gamma delta butene tricarboxylic acid, and the like. Many others may be synthesized including various substitution products all of which are suitable for this invention providing the substituents do not destroy the polymerizability of the esters.

Although the preparation of the esters do not constitute a part of the present invention, it may be explained that they may be prepared by esterifying the acid with alcohols. An esterification catalyst may be used together with inert diluent material such as naphtha which is suitable for removing the water of esterification. Although primary, saturated, long chained alcohols are particularly useful in the preparation of the tricarboxylic esters, secondary alcohols, branched chained alcohols, oxo alcohols, cyclic alcohols, phenols, hydroxy acids, hydroxy esters and other hydroxy compounds may be used.

Chain lengths of the hydroxy compounds used in esterifying aconitic acid or in the case of copolymers, of the other olefinic material, may vary so long as there is present in the product at least one group having at least 8 carbon atoms. The preferred average chain length depends somewhat on the type of lubricating oil with which the product is to be used. For example, in the case of light oils of SAE-10 grade which have been heavily dewaxed to relatively low pour and cloud points, relatively straight chains of 8 or more carbon atoms, preferably averaging 11 to 14 carbon atoms may be used. However, where the lubricant has been dewaxed to a lesser extent, an average of 13 to 16 carbon atoms may give the optimum pour point depression. Groups containing less than 8 carbon atoms, for example, $C_1$ to $C_6$, have a definite but relatively smaller effect on pour point depression potency than the larger groups. It has also been found that somewhat different size groups are required if the groups are not straight chained but rather are branched chained such as those derived by the hydrogenation of carbon monoxide or by the oxo reaction between branched chain olefins and carbon monoxide and hydrogen.

One very suitable commercially available mixed alcohol is a product obtained by hydrogenation of coconut oil. Such a product is sold under the name "Lorol" and is a mixture of saturated straight chained alcohols ranging from about 8 to 18 carbon atoms having a major proportion of lauryl alcohol containing 12 carbon atoms. Other related products are made by separating this material, which may be considered as a crude mixture, into several different fractions having a relatively higher proportion of either the higher, lower or medium constituents thereof. The composition of the "Lorol" per se and other related products called "Lorol B" and "Lorol R" is approximately as follows:

Composition of mixtures of commercial alcohols

| Component | Lorol | Lorol B Weight Per Cent | Lorol R |
|---|---|---|---|
| $C_{10}$ Alcohol | 4.0 | 3.0 | 1.0 |
| $C_{12}$ Alcohol | 55.5 | 46.0 | 85.0 |
| $C_{14}$ Alcohol | 22.5 | 24.0 | 13.0 |
| $C_{16}$ Alcohol | 14.0 | 10.0 | 1.0 |
| $C_{18}$ Alcohol | 4.0 | 17.0 | |
| Average Number of Carbon Atoms | 12.8 | 13.5 | 12.2 |

It is generally preferable that the monomeric esters be essentially neutral. However, partial esters are also useful in the preparation of polymers and copolymers and are particularly suitable for special purposes such as rust inhibitors and the like. The free carboxyl groups may also be converted into the metal salts for lube oil additives.

The polymerization of the alpha beta unsaturated tricarboxylic acid esters often requires more drastic conditions than some of the other alpha beta unsaturated acid esters such as fumarates, acrylates and the like. Nevertheless, valuable polymers may be produced by the use of catalysts such as benzoyl peroxide, acetyl peroxide, boron fluoride, clay, alumina and the like. Copolymerization of the alpha beta unsaturated tricarboxylic ester with other unsaturated materials in most cases proceeds more readily than polymerization of the ester alone. Some of the materials suitable for copolymerization are the vinyl esters, vinyl halides, vinyl ethers, vinylidene halides, vinyl ketones, maleates, fumarates, acrylates, methacrylates, butadiene, styrene and the like. The copolymerization reactions may be effected with the same type of catalysts as described for polymerization reactions. The degree of polymerization may range from the dimer up to 50 or 60 units, corresponding to molecular weights from about 1,000 to about 50,000. When the polymers and copolymers of the invention are used as viscosity index improvers, the molecular weight range of 8,000–20,000 is preferred.

The polymers and copolymers produced according to this invention impart valuable properties to lubricating oils when used in small quantities of about 0.01% to 5.0% by weight based on the lubricating oil. However, still larger quantities can be used with beneficial effects. These products are effective not only as pour depressants and viscosity index improvers but also as oxidation inhibitors, corrosion inhibitors, rust inhibitors, sludge dispersers, oiliness agents, extreme pressure lubricants, modifying agents in waxes and greases, and the like. It will be understood that the compositions may also contain other additives, for example, pour depressants, viscosity index improvers, metallic soaps, dyes, anti-foam agents, oxidation inhibitors, organometallic compounds, extreme pressure agents, and the like.

The invention will better be understood from consideration of the following examples:

EXAMPLE 1

A 25 x 200 mm. test tube was charged with 25 grams of tri-Lorol B aconitate and placed in a bath at 80° C. After the air was replaced with nitrogen, 0.25 gram of powdered benzoyl peroxide was added and the mixture blown with nitrogen until the peroxide dissolved. The test tube was stoppered and allowed to remain in the bath for 46 hours. At the end of this time the polymer which was produced had a viscosity at 210° F. of 59.4 Saybolt seconds.

EXAMPLE 2

Example 1 was repeated using 40 grams of tri-Lorol B aconitate and 2.0 grams of benzoyl peroxide. The reaction time was cut to 28 hours. The resulting polymer had a viscosity at 210° F. of 98.2 Saybolt seconds.

EXAMPLE 3

A 25 x 200 mm. test tube was charged with 36 grams of tri-Lorol B aconitate and 4 grams of vinyl acetate. The air was displaced by gently blowing with nitrogen then 0.4 gram of powdered benzoyl peroxide was added and again blown gently with nitrogen until the peroxide was dissolved. The test tube was stoppered and placed in an oven at 80° C. for 17 hours. At the end of the time, the resulting copolymer had a viscosity at 210° F. of 114 Saybolt seconds.

EXAMPLE 4

Example 3 was repeated using 32 grams of tri-Lorol aconitate and 8 grams of vinyl acetate. The resulting copolymer had a viscosity at 210° F. of 716 Saybolt seconds.

The polymers and copolymers produced in the above experiments were blended in reference oils which shall be denominated A, B and C and the ASTM pour points determined with the following results:

| Polymer or Copolymer | A | B | C |
|---|---|---|---|
|  | ° F. | ° F. | ° F. |
| None | +5 | +15 | +30 |
| 0.2% of Polymer (Ex. 1) | −5 | −15 | +30 |
| 0.2% of Polymer (Ex. 2) | −15 | −30 | −30 |
| 0.2% of Copolymer (Ex. 3) | −20 | −20 | −25 |
| 0.2% of Copolymer (Ex. 4) | −20 | −25 | −35 |

The reference oils have compositions as follows:

| Oil | Description | Pour Point |
|---|---|---|
|  |  | ° F. |
| A | A solvent extracted Mid-Continent neutral | +5 |
| B | An extracted Mid-Continent neutral and Bright Stock | +15 |
| C | A conventionally refined Mid-Continent distillate +Bright Stock | +30 |
| D | A conventionally refined Penn 180 neutral | +5 |

EXAMPLE 5

N-octyl, n-decyl, n-hexadecyl and n-octadecyl aconitates were used in the combinations indicated in the table below for producing copolymers having an average side chain length of 12 carbon atoms. In these experiments 200 g. of total esters were treated with 10 g. of benzoyl peroxide in a nitrogen atmosphere using 1 liter 3 necked flasks equipped with a stirrer and thermometer. One-half of the catalyst was added at the start of the reaction and the remainder after one hour. The reaction flasks were kept in a bath at 80° C. and stirred during the course of the polymerization which was stopped after 18 hours. The following data were obtained on these products:

| Ester | Mol Ratio | Weight | Saybolt Viscosity at 210° F. of Copolymer | ASTM Pour Points of 0.5% Blends | | |
|---|---|---|---|---|---|---|
|  |  |  |  | Oil B | Oil C | Oil D |
|  |  | G. |  |  |  |  |
| n octyl aconitate | 1 | 75.3 |  |  |  |  |
| n hexadecyl aconitate | 1 | 124.7 | 92 | −15 | −10 | +5 |
| n decyl aconitate | 2 | 116.8 |  |  |  |  |
| n hexadecyl aconitate | 1 | 83.2 | 84 | −25 | −10 | −10 |
| n octyl aconitate | 1.5 | 90.2 |  |  |  |  |
| n octadecyl aconitate | 1 | 109.8 | 94 | +15 | +20 | +5 |
| n decyl aconitate | 3 | 131.4 |  |  |  |  |
| n octadecyl aconitate | 1 | 68.6 | 86 | −20 | −5 | 0 |

Pour Point of oil B = +15; oil C = +30; oil D = +5.

EXAMPLE 6

A 1 liter 4 necked flask equipped with a stirrer, thermometer and condenser was charged with 170 g. of Lorol B aconitate and then heated to 80° C. in an oil bath. After displacing the air with nitrogen, 30 g. of methyl acrylate were added thru the condenser. To this mixture was added 2 g. of benzoyl peroxide followed by an additional 2 g. after 6 hours. The copolymerization was continued for a total of 30 hours at 80° C. and the resulting product has a viscosity at 210° F. of 170.3 Saybolt seconds.

The copolymer was blended in 3 base stocks to determine its pour depressant properties which are tabulated below.

|  | ASTM Pour Points of Blends | | |
|---|---|---|---|
|  | Oil B | Oil C | Oil D |
|  | °F. | °F. | °F. |
| No Copolymer | +15 | +30 | +5 |
| 0.5% Copolymer | −15 | −20 | −30 |

It is not intended that this invention be limited to the specific materials which have been mentioned merely for the sake of illustration but only by the appended claims in which it is intended to claim all novelty inherent in the invention as well as all modifications coming within the scope and spirit of the invention.

What is claimed is:

1. A composition consisting essentially of a major proportion of a waxy mineral lubricating oil and a small amount, sufficient to depress the pour point thereof, of a copolymer of about four parts by weight of a tri-ester of aconitic acid wherein at least one ester group contains from 8 to 18 saturated carbon atoms and about one part by weight of vinyl acetate, said copolymer having a molecular weight of from 1,000 to 50,000.

2. A composition consisting essentially of a major proportion of a waxy mineral lubricating oil and from 0.01% to 5.0% by weight, based on the weight of the total composition, of the copolymer of about four parts by weight of a tri-ester of aconitic acid wherein at least one ester group is derived from mixed alcohols obtained by hydrogenation of coconut oil and about one part by weight of vinyl acetate, said copolymer having a molecular weight within a range of from 1,000 to 50,000.

JEFFREY H. BARTLETT.

REFERENCES CITED

The following references are of record in the file of this patent:

UNITED STATES PATENTS

| Number | Name | Date |
|---|---|---|
| 2,279,881 | D'Alelio | Apr. 14, 1942 |
| 2,375,516 | Blair | May 8, 1945 |
| 2,419,122 | Cox | Apr. 15, 1947 |
| 2,437,962 | Kropa | Mar. 16, 1948 |
| 2,486,839 | Gordan | Nov. 1, 1949 |